March 27, 1962  R. L. ATKINSON  3,027,205
BEARINGS, BEARING ASSEMBLIES AND MACHINERY
GUARDS INCORPORATING THEM
Filed Sept. 29, 1959
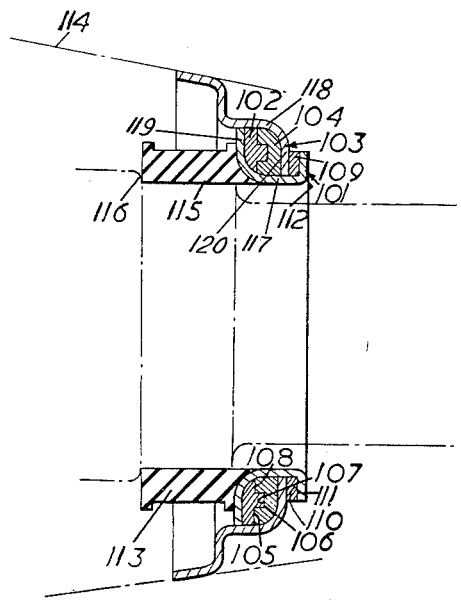
Inventor:
RICHARD LESLIE ATKINSON
By
Richardson, Davis and Nordon
Attorneys.

| United States Patent Office | 3,027,205 |
|---|---|
| | Patented Mar. 27, 1962 |

3,027,205
BEARINGS, BEARING ASSEMBLIES AND MACHINERY GUARDS INCORPORATING THEM
Richard L. Atkinson, Bolton-by-Bowland, near Clitheroe, England, assignor to Atkinson's Agricultural Appliances Limited, Clitheroe, England, a company of Great Britain
Filed Sept. 29, 1959, Ser. No. 843,120
Claims priority, application Great Britain June 13, 1959
5 Claims. (Cl. 308—163)

This invention relates to new and improved bearings and bearing assemblies; it also relates to machinery guards incorporating such bearings or bearing assemblies, and more particularly to safety guards of the kind comprising a tubular sheath floatingly encompassing and supported by a rotatable shaft. The invention is especially intended for use with shaft couplings comprising a telescopic shaft provided at each of its ends with a universal joint for connection to the driving and driven machinery respectively.

The present invention is a thrust bearing having an outer race and in inner race, said races being co-axial and rotatable with respect to each other, wherein a first annular synthetic fibre bearing element is bonded to one of said races and a second such element to the other of said races, opposing faces of said elements being in mutual rubbing relationship when relative rotation between said races takes place.

The present invention is also a bearing assembly comprising a bearing having an outer annular member and an inner annular member, said members being co-axial and rotatable with respect to each other, at least one of said members having attached thereto and extending axially therefrom an at least radially resilient sleeve. The annular members may constitute the outer and inner races of a ball bearing, as hereinafter defined, which may be either a journal or a thrust type of bearing.

The present invention is also a shaft envelope comprising a tubular sheath, said sheath having internally attached thereto the outer annular member of a bearing or of a bearing assembly, as hereinbefore defined.

By the term "ball bearing" as used herein and in the appended claims, is to be understood any bearing having an outer race, an inner race and one or more anti-friction components between them, as hereinafter exemplified, and also includes rollers.

Bearing assemblies and shaft envelopes or tubular safety guards according to the invention are suitable for fitting to shafts which have not got specially machined surfaces for the fitting of the inner race of ordinary ball bearings; the invention is therefore particularly suitable for providing shafts of existing machinery with safety guards.

A preferred embodiment of the invention will now be described with reference to the accompanying drawing, which is an axial section through a bearing assembly, incorporating a thrust bearing, all according to the invention.

In the drawing an inner race 101 has a first annular nylon bearing element 102 bonded to it, and an outer race 103 has a second annular nylon bearing element 104 bonded to it. The bearing face 105 of element 102 has an annular spigot 106 extending axially into a mating annular recess 107 in the opposing bearing face 108 of element 104. The races 101 and 103 are radially-spaced co-axial rings 117 and 118, respectively, integral with radial cheeks 119 and 120, respectively, which are spaced apart from one another longitudinally of the rings and have mutually confronting inside faces and mutually remote outside faces. The elements 102 and 104 are bonded to the inside faces of the cheeks 119 and 120, respectively, and the bearing faces of the elements 102 and 104 are also radial.

The outer race 103 has also a third annular nylon bearing element 109 bonded to it; this third element 109 is bonded to the outside face of the radial cheek 120, and has a bearing face 110 which bears against the face 111 of a radial flange 112 on the ring 117 which flange is spaced outwardly from the outside face of the radial cheek 120. Thus the bearing is capable of withstanding thrusts in either axial direction.

The radial cheek 119 of the inner race 101 has bonded to it on its outside face a rubber sleeve 113 which is co-axial with the ring 117 of the inner race 101 and is of the same bore as the ring 117.

The bearing elements 102, 104, and 109 may be of a synthetic fibre other than nylon.

The above described thrust bearing assembly or tubular machinery guard, being a modification of the bearing assembly described and claimed in the specification accompanying our co-pending patent application, Serial No. 852,457, filed November 12, 1959, is particularly suited for use in a telescopic shaft envelope assembly for use on a telescopic shaft coupling as also described in the said specification. When so used, the outer race 103 of a bearing assembly is riveted to the conical end-piece of each of the two shaft envelopes making up the shaft envelope assembly or tubular machinery guard, the said end-piece being shown dotted at 114 in the accompanying drawing. To fit a shaft envelope assembly over a telescopic shaft coupling between a tractor and an implement, the tractor and the implement are connected and the telescopic shaft is fitted to the implement. The male section of the shaft is withdrawn and the shaft envelope assembly is fitted over the female section of the shaft. The male section of the shaft is re-connected and the shaft is coupled to the tractor power-take-off. The conical end-pieces are then pulled apart until the rubber sleeves 113 of each of the two bearing assemblies encompass the bosses 115 of their respective universal joints and abut the shoulders 116 thereof, as shown dotted in the accompanying drawing.

The rubber sleeves 113 being so dimensioned, in relation to the universal joints with which they are intended to be used, that they form an interference fit with the bosses 115, the inner races 101 are held on and capable of rotation with the telescopic shaft members to which the universal joints are attached, whilst the outer races 103 and the shaft envelopes 114 to which they are riveted, will remain stationary if a small braking torque is applied to them, e.g. by hand. The shaft envelope assembly thus forms a safety guard for the shaft.

The above described thrust bearing, that is to say the thrust bearing assembly without the rubber sleeve 113 is suitable for a variety of applications requiring a thrust bearing, including a tubular safety guard as described and claimed in the specification accompanying our co-pending patent application Serial No. 838,993, filed September 9, 1959.

I claim:

1. A thrust bearing comprising an outer race and an inner race, said races being radially-spaced co-axial rings each integral with a radial cheek extending in the direction of the other ring, said cheeks being spaced apart from one another longitudinally of said rings and having mutually confronting inside faces and mutually remote outside faces, a first annular bearing element of synthetic fibre bonded to the inside face of one of said cheeks, a second annular bearing element of synthetic fibre bonded to the inside face of the other of said cheeks, said first and second bearing elements contacting one another over their surfaces remote from the pertaining cheeks and defining thereat radial bearing faces, said inner race ring extending outwardly beyond said outside face of said outer race cheek, a radial flange on said inner race ring at some spacing from said outside face of said outer race cheek, and a third annular bearing element of synthetic fibre sandwiched between said outside face of said outer race cheek and said flange to form thrust faces for axial thrust between said races in a direction tending to separate said first and second bearing elements.

2. A thrust bearing comprising an outer race and an inner race, said races being radially-spaced co-axial rings each integral with a radial cheek extending in the direction of the other ring, said cheeks being spaced apart from one another longitudinally of said rings and having mutually confronting inside faces and mutually remote outside faces, a first annular nylon bearing element bonded to the inside face of one of said cheeks, a second annular nylon bearing element bonded to the inside face of the other of said cheeks, said first and second bearing elements contacting one another over their surfaces remote from the pertaining cheeks and defining thereat radial bearing faces, an annular spigot extending from one of said radial bearing faces, the other of said radial bearing faces having an annular recess mating with said spigot, said inner race ring extending outwardly beyond said outside face of said outer race cheek, a radial flange on said inner race ring at some spacing from said outside face of said outer race cheek and a third annular nylon bearing element sandwiched between said outside face of said outer race cheek and said flange to form thrust faces for axial thrust between said races in a direction tending to separate said first and second bearing elements, said third annular bearing element being bonded to said outside face of said outer race cheek.

3. A thrust bearing comprising an outer race and an inner race, said races being radially-spaced co-axial rings each integral with a radial cheek extending in the direction of the other ring, said cheeks being spaced apart from one another longitudinally of said rings and having mutually confronting inside faces and mutually remote outside faces, a first annular bearing element of synthetic fibre bonded to the inside face of one of said cheeks, a second annular bearing element of synthetic fibre bonded to the inside face of the other of said cheeks, said first and second bearing elements contacting one another over their surfaces remote from the pertaining cheeks and defining thereat radial bearing faces, a sleeve bonded to the outside face of said inner race cheek and extending axially therefrom, said sleeve being at least radially resilient and being of the same bore as said inner race ring, said inner race ring extending outwardly beyond said outside face of said outer race cheek, a radial flange on said inner race ring at some spacing from said outside face of said outer race cheek and a third annular bearing element of synthetic fibre sandwiched between said outside face of said outer race cheek and said flange and bonded to one of them to form thrust faces for axial thrust between said races in a direction tending to separate said first and second bearing elements.

4. A thrust bearing comprising an outer race and an inner race, said races being radially-spaced co-axial rings each integral with a radial cheek extending in the direction of the other ring, said cheeks being spaced apart from one another longitudinally of said rings and having mutually confronting inside faces and mutually remote outside faces, a first annular nylon bearing element bonded to the inside face of one of said cheeks, a second annular nylon bearing element bonded to the inside face of the other of said cheeks, said first and second bearing elements contacting one another over their surfaces remote from the pertaining cheeks and defining thereat radial bearing faces, an annular spigot extending from one of said radial bearing faces, the other of said radial bearing faces having an annular recess mating with said spigot, a sleeve bonded to the outside face of said inner race cheek and extending axially therefrom, said sleeve being at least radially resilient and being of the same bore as said inner race ring, said inner race ring extending outwardly beyond said outside face of said outer race cheek, a radial flange on said inner race ring at some spacing from said outside face of said outer race cheek and a third annular nylon bearing element sandwiched between said outside face of said outer race cheek and said flange to form thrust faces for axial thrust between said races in a direction tending to separate said first and second bearing elements, said third annular nylon bearing element being bonded to said outside face of said outer race cheek.

5. In a tubular machinery guard adapted floatingly to encompass a shaft member, a thrust bearing comprising an outer race and an inner race, means securing said outer race internally and co-axially to said guard, said races being radially-spaced co-axial rings each integral with a radial cheek extending in the direction of the other ring, said cheeks being spaced apart from one another longitudinally of said rings and having mutually confronting inside faces and mutually remote outside faces, a first annular nylon bearing element bonded to the inside face of one of said cheeks, a second annular nylon bearing element bonded to the inside face of the other of said cheeks, said first and second bearing elements contacting one another over their surfaces remote from the pertaining cheeks and defining thereat radial bearing faces, an annular spigot extending from one of said radial bearing faces, the other of said radial bearing faces having an annular recess mating with said spigot, a sleeve bonded to the outside face of said inner race cheek and extending axially therefrom, said sleeve being at least radially resilient and being of the same bore as said inner race ring, said inner race ring extending outwardly beyond said outside face of said outer race cheek, a radial flange on said inner race ring at some spacing from said outside face of said outer race cheek and a third annular nylon bearing element sandwiched between said outside face of said outer race cheek and said flange to form thrust faces for axial thrust between said races in a direction tending to separate said first and second bearing elements, said third annular nylon bearing element being bonded to said outside face of said outer race cheek.

References Cited in the file of this patent
UNITED STATES PATENTS

| | | |
|---|---|---|
| 599,150 | Reilly | Feb. 15, 1898 |
| 1,966,795 | Garrison | July 17, 1934 |
| 2,612,418 | Krotz | Sept. 30, 1952 |
| 2,724,867 | Smith | Nov. 29, 1955 |

FOREIGN PATENTS

| | | |
|---|---|---|
| 1,141,042 | France | Mar. 11, 1957 |
| 637,888 | Great Britain | May 31, 1950 |
| 757,582 | Great Britain | Sept. 19, 1956 |
| 29,441 | Sweden | Sept. 3, 1910 |